US006581849B2

United States Patent
Zhang

(10) Patent No.: US 6,581,849 B2
(45) Date of Patent: Jun. 24, 2003

(54) AUTOMATIC SEMI-CONDUCTOR CONDENSATE FLOWER-WATERING DEVICE

(76) Inventor: Zhengyu Zhang, Rm 401, Pana Tower, No. 128 Zhichun Road Haidian District, Beijing (CN), 100086

( * ) Notice: Subject to any disclaimer, the term of this patent is extended or adjusted under 35 U.S.C. 154(b) by 114 days.

(21) Appl. No.: 09/865,029

(22) Filed: May 24, 2001

(65) Prior Publication Data

US 2002/0053604 A1 May 9, 2002

(30) Foreign Application Priority Data

Oct. 24, 2000 (CN) .......................... 00129899 A

(51) Int. Cl.⁷ .................. A62G 25/00; A62G 27/00; B05B 1/24
(52) U.S. Cl. .................. 239/63; 239/64; 239/65; 239/67; 239/68; 239/69; 239/128
(58) Field of Search .................. 239/63, 69, 64, 239/65, 68, 128, 67, 13, 542, 200; 47/48.5, 66.6

(56) References Cited

U.S. PATENT DOCUMENTS 4,304,528 A * 12/1981 Jordan .................. 417/208
4,651,468 A * 3/1987 Martinez et al. .................. 47/80
5,601,236 A * 2/1997 Wold .......................... 239/63
5,634,342 A * 6/1997 Peeters et al. .................. 62/3.4

* cited by examiner

Primary Examiner—Davis Hwu
(74) Attorney, Agent, or Firm—Kinney & Lange, P.A.

(57) ABSTRACT

The automatic semi-conductor condensate flower watering device consists of a condensate part, a heat radiating part and a soil moisture control part, in which the said condensing part is composed of a semi-conductor cooling block with a refrigerating and heat-conducting base plate and a heat radiating and conducting base plate attached to both of its sides. On the said refrigerating and heat conducting base plate is installed the condensing fins and on the heat radiating and conducting base plate is installed the heat radiating fins. The said heat radiating part includes radiating fins and an outlet channel that is formed by the radiating fins. The gap between the said condensing fins is less or equal to 1.5 mm. On the refrigerating and heat conducting base plate is installed a water wiper. The present flower watering device also includes a soil moisture unit that can impose a precise control over the moisture of the soil at any time and even when the relative humidity of the air is 40%, it still can respond to the changes in the humidity of the atmosphere. Besides, it also has a high efficiency of water collection and can make full use of the water resources contained in the air.

12 Claims, 4 Drawing Sheets

AUTOMATIC SEMI-CONDUCTOR CONDENSATE FLOWER-WATERING DEVICE

BACKGROUND OF THE INVENTION

The present invention relates to a semi-conductor condensate device, particularly to a flower-watering device that collects liquid from the air and automatically controls the moisture of the soil.

DESCRIPTION OF THE PRIOR ART

The growing of plants and flowers for appreciation has long been a very important everyday activity in our life and the cultivation of new breeds of plants is also an important scientific project. These activities all require a scientific and precise control of the humidity of the soil in order to satisfy the conditions of plant and flower cultivation and other scientific requirements. Two conventional ways are adopted in preservation of the moisture of soil and in the watering of plants, one of which is to use running water to effect spray irrigation of the plant and flowers and the other is to use natural accumulations of water as much as possible. These are two careless applications of irrigation in flower watering and cannot adjust the soil moisture accurately and at the same time require a lot of manpower. In particular, they consume the precious surface water of the earth and to some extent are dependent upon natural conditions. For most of the plant and flower amateurs, they are constantly vexed by their lack of experience in the means of controlling soil moisture, thus they often cannot achieve their desired effects in plant and flower cultivation.

A technology of gathering water from the air through the use of solar energy is reported in China Utility Model Patent CN 98 2 00378.1, in which is included a water producing device that is capable of receiving solar energy through a solar panel and transforming the solar energy into electrical currents and voltage, which are sent to the semi-conductor cooler unit through the switching circuit. Said cooling unit adopts a heat tube whose cooling end engages the cooling surface of the said semi-conductor unit and when the fin of the semi-conductor that touches the other end of the heat tube is cooled, the moisture of the air is then condensed on the fin so that the gathering of water in the air is achieved. This gadget calls for the heat tube technology in order to collect the moisture in the air and this increases the costs. Furthermore, the wide gaps between the fins result in a low efficiency of water condensation, thus hardly satisfying practical needs.

SUMMARY OF THE INVENTION

The object of the present invention is to provide an automatic flower watering device that has a high efficiency of water collecting and can make full use of the water contained in the air and have a precise control of the moisture of the soil.

In order to achieve the above-mentioned object, the present invention provides an automatic semi-conductor condensate flower watering device, which comprises a condensate part, a heat radiating part and a soil moisture control part. Said condensate part composed of a semi-conductor cooling block with a refrigerating and heat-conducting base plate and a heat radiating and conducting base plate attached to both of its sides. On said refrigerating and heat conducting base plate is installed the condensate fins and on the heat radiating and conducting base plate is installed the heat radiating fins. Said heat radiating part includes the heat radiating fins and an outlet channel that is formed by the heat radiating fins, wherein:

said condensing fins have very small gaps between them, and accordingly, on the said refrigerating and heat conducting base plate is also mounted a water wiper;

said soil moisture control mechanism includes a moisture control circuit and a humidity alarm unit.

The automatic semi-conductor condensate flower watering device according to the present invention uses a semi-conductor as the condensing mechanism, thus making full use of the cooling properties of the device. By reducing the gaps between the condensing fins and using the water wiper, the efficiency for condensation of the device is further enhanced. In addition to this, because of the use of the moisture control circuit, the humidity of the soil is thus under precise control. This automatic flower-watering device is simple in structure and less costly in water production and maintenance. Its main characteristic is that the device has a high rate of water collection and it can respond to changes in the air humidity even when the relative humidity of the air reaches only 40%. Furthermore, it can control the humidity of the soil continuously and fulfil all the requirements of the soil humidity control under various conditions.

BRIEF DESCRIPTION OF THE DRAWINGS

The structure of the automatic semi-conductor condensate flower watering device of the present invention and its operation and thus the advantages of such a device will become more apparent from the following detailed description of an embodiment of the present invention with reference to the accompanying drawings, in which

FIGS. 2a–2c show the structure of the water wiper used in the embodiment of the flower-watering device in FIG. 1a, wherein FIG. 2b is a view of FIG. 2a from the point of B, and FIG. 2c is a view of FIG. 2b from the point of A.

DETAILED DESCRIPTION OF THE PREFERRED EMBODIMENT

Figures 1A, 1B:
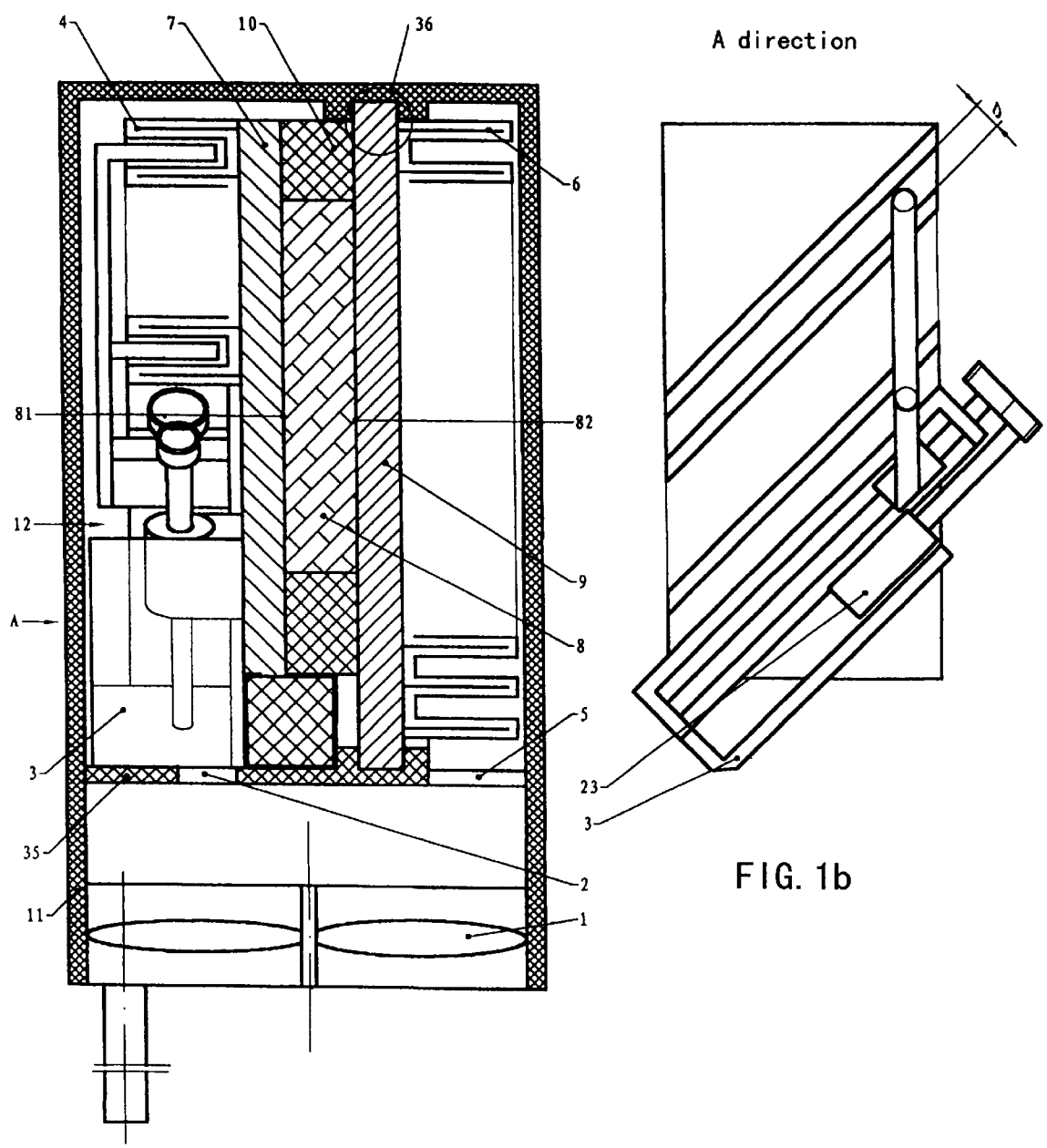
FIG. 1a is a longitudinal profile showing the overall structure of the embodiment of the automatic semi-conductor condensate flower watering device according to the present invention.
FIG. 1b is a view of FIG. 1a from the point of A.

FIG. 1 is a longitudinal diagram showing the overall structure of an embodiment of the present automatic semi-conductor condensate flower watering device. The semi-conductor flower watering device in the present embodiment can provide an amount of 4 ml/h condensed water under a temperature of 25° C. and a relative humidity of 40%, that is, an amount of more than 100 milliliters of condensed water every 24 hours.

The humid air is conveyed into the inlet air channel by the axial fan where the air current is divided into two branches, one way of them enters into the condensing air channel formed by the condensing fins 4 through the air hole 2 conducted by guide plate 3 and the moisture contained in the humid air is condensed here before the dry air is discharged into the atmosphere through the air outlet (not indicated in the drawing) on the casing of the flower watering device. Another way of the air current flows into the heat radiating channel formed by the radiating fins 6 through the air hole 5. The air current absorbs the heat from the radiating fins 6 and is discharged into the atmosphere through another air outlet (not indicated in the drawing) on the casing of the flower watering device. It is by this manner that the heat is discharged into the atmosphere.

The refrigerating surface 81 and the heat delivery surface 82 of the semi-conductor cooling block 8 used in the condensing part of the embodiment of the present invention contact with the condensing and heat conducting base plate 7 and the heat radiating and conducting base plate 9 respectively. When in operation, the heat in the humid air current that passes through the condensing fins 4 is absorbed by the latter and is further transmitted to the refrigerating surface 81 of the semi-conductor cooling block 8 through the condensing and heat conducting base plate 7. Under the action of the Peltier effect, the cooling block 8 then conveys the heat energy from the refrigerating surface 81 of the semi-conductor cooling block to the heat delivery surface 82 of the semi-conductor cooling block 8 and then on to the radiating fins 6 through the heat radiating and conducting base plate 9 before it is finally discharged into the atmosphere together with the air that passes through the radiating fins 6. The semi-conductor cooling block 8 of the present embodiment is connected in series by two TECI-12704 model cooling blocks.

The heat contained in the humid air that flows over the condensing fins 4 is absorbed by the condensing fins 4, which makes the temperature of the air drop below the dew-drop temperature, then the moisture in the humid air is separated out and forms little water drops or frost on the surface of the condensing fins 4.

As mentioned before, the condensing and heat conducting base plate 7 is set close on the refrigerating surface 81 of the semi-conductor cooling block 8 and the heat radiating and conducting base plate 9 is set close on the heat delivery surface 82 of the semi-conductor cooling block 8. In order to ensure the proper conductivity of the respective contacting surfaces, heat conducting silicon grease is spread on the contacting surfaces. Two or more semi-conductor cooling blocks 8 are set between the condensing and heat conducting base plate 7 and the heat radiating and conducting base plate 9 to suit the different requirements of the power of the products with plastic foam 10 padded between the gaps. The said base plates 7 and 9 are connected by bolts between them and fixed in the locating slot 36 on the outer casing 11 of the flower watering device from under. A sealing plate 35 and an axial fan 1 are installed on it, fixed by bolts on the inside of the outer casing 11 of the flower watering device. The locating slot 36 also functions to seal and isolate the condensing channel and the radiating channel.

The condensing and heat conducting base plate 7 and the condensing fins 4 are die-cast with nonferrous metals with good heat conductivity such as aluminum-alloy or warped into a certain shape with nonferrous sheet metal strips with good heat conductivity. In the latter case, the sheet metal strips are welded on the condensing and heat conducting base plate 7 through soft soldering. The surface of the condensing fins 4 is sprayed with low surface energy material such as polytetrafluoroethylene. The distance D (see FIG. 1b) between the condensing fins is less than or equal to 1.5 mm. The heat radiating fins 6 are warped into a shape with sheet copper strips and welded on the heat radiating and conducting base plate 9 through soft soldering. The distance D (see FIG. 1b) between the heat radiating fins is less than or equal to 1.5 mm.

In the present design, the distance between the condensing fins 4 is smaller than that in conventional devices; therefore, it can enhance the efficiency of condensation of the flower-watering device. However, as a result of this, the condensation on the surface of the fins and the consequent accumulation of water could stop the condensing air channel and could even cause the suspension of the condensing process. In order to solve the above-mentioned problem, a water wiper is augmented in the flower watering device in the embodiment according to the present invention.

Figure 2A:
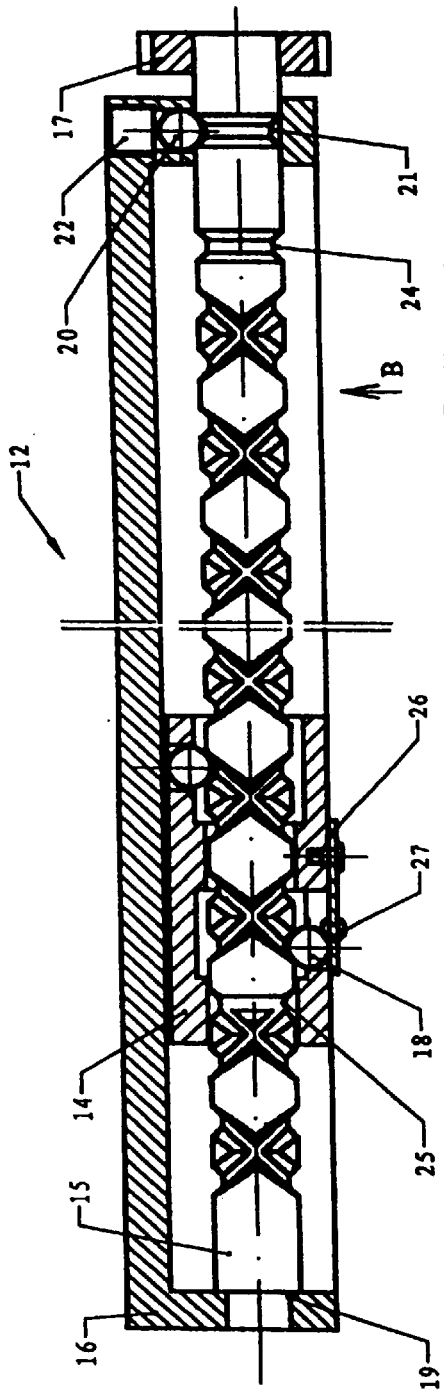
Figure 2B:
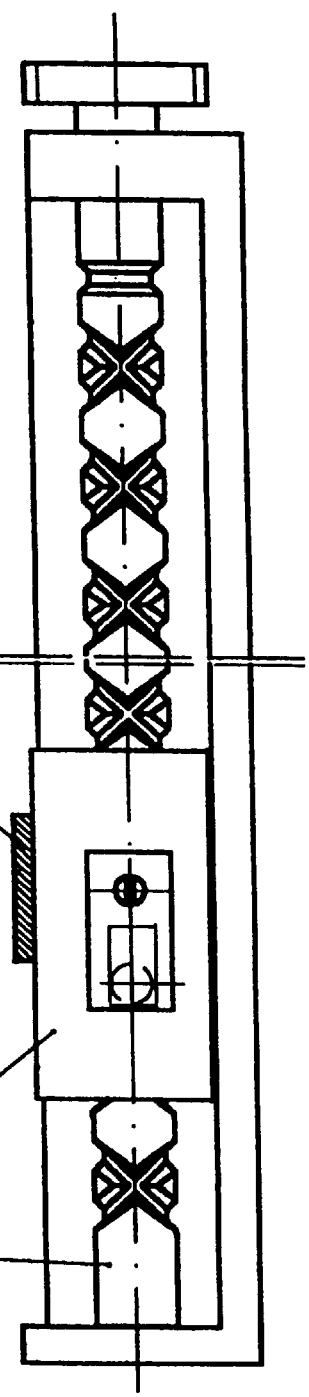
Figure 2C:
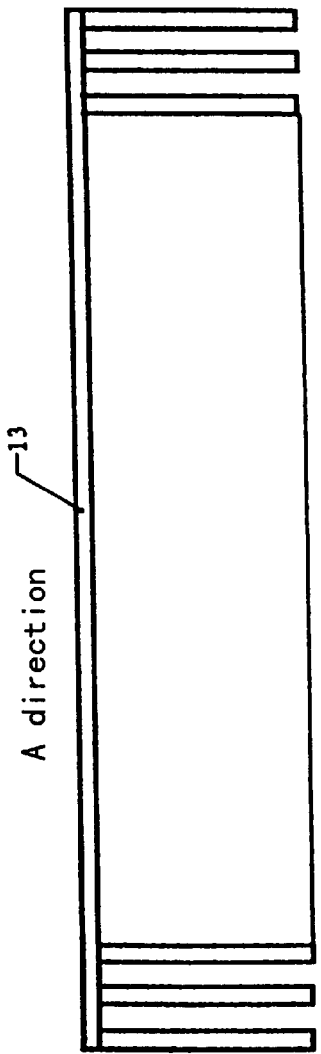

As shown in FIGS. 2a–2c, the water wiper 12 consists of a water brush 13, a slide block 14, a drive screw 15, a guide slot 16 and a gear 17. The water wiper 12 is installed on the condensing and heat conducting base plate 7 through the guide slot 16 with a bolt.

The body of the water wiper 13 is shaped through injection molding and its surface is coated with a metallic film of high surface energy or the entire body of the wiper is die-cast with high surface energy metal and mounted on the slide block 14, in the middle of which there are two transmission balls 18 located on both sides of the drive screw and the axial distance of the balls is around 1.5 times the length of the thread pitch. The slide block 14 has an axial movement guide hole through which it is mounted on the drive screw 15 with interlacing spirals. The drive screw 15 is mounted on the axial holes on both ends of the guide slot 16, with one end limited by the boss 19 of the drive screw, and at the other end the locating slot 21 of the drive screw 15 is limited by the steel balls 20, which realizes axial spacing. The steel balls 20 are then limited in the guide slot 16 by a plug screw 22. The servo-actuator 23 (see FIG. 1b) mounted on the condensing and heat conducting base plate 7 drives the drive screw 15 through the gear 17.

As shown in FIG. 2a, because the drive screw 15 has an interlacing left-hand screw thread and a right-hand screw thread with the same thread pitch, there is a connecting groove 21 that runs in the same direction of the screw threads at both ends of the screw threads of the drive screw 15, joining the two screw threads. There is a connecting groove 25 at a distance of about 1.5 times the thread pitch from either end of the screw threads on the drive screw 15. The said connecting groove 25 joins the said interlacing screw threads in the direction of the threads. When the left-hand thread of the transmission balls 18 traverses the right-hand thread, a change occurs in the helix angle of the two transmission balls. At this time, the transmission balls 18 installed on one side of the spring-loaded brake 26 props up the spacing rivet 27 and projects towards the void space opposite so as to adjust the change of the relative helix angle.

The unidirectional gyration of the drive screw 15 is then capable of setting the slide block 14 to linear reciprocating motion with the water wiper 13 in the gap of the condensing fins 4 so as to wipe away the water condensed on the surface of the condensing fins 4. The water wiped from the surface of the condensing fins 4 drops into the water tank (not showed) below the condensing part and then passes through the drip pipe that is connected to the water tank (see FIG. 3) before it flows into the soil.

Figure 3:
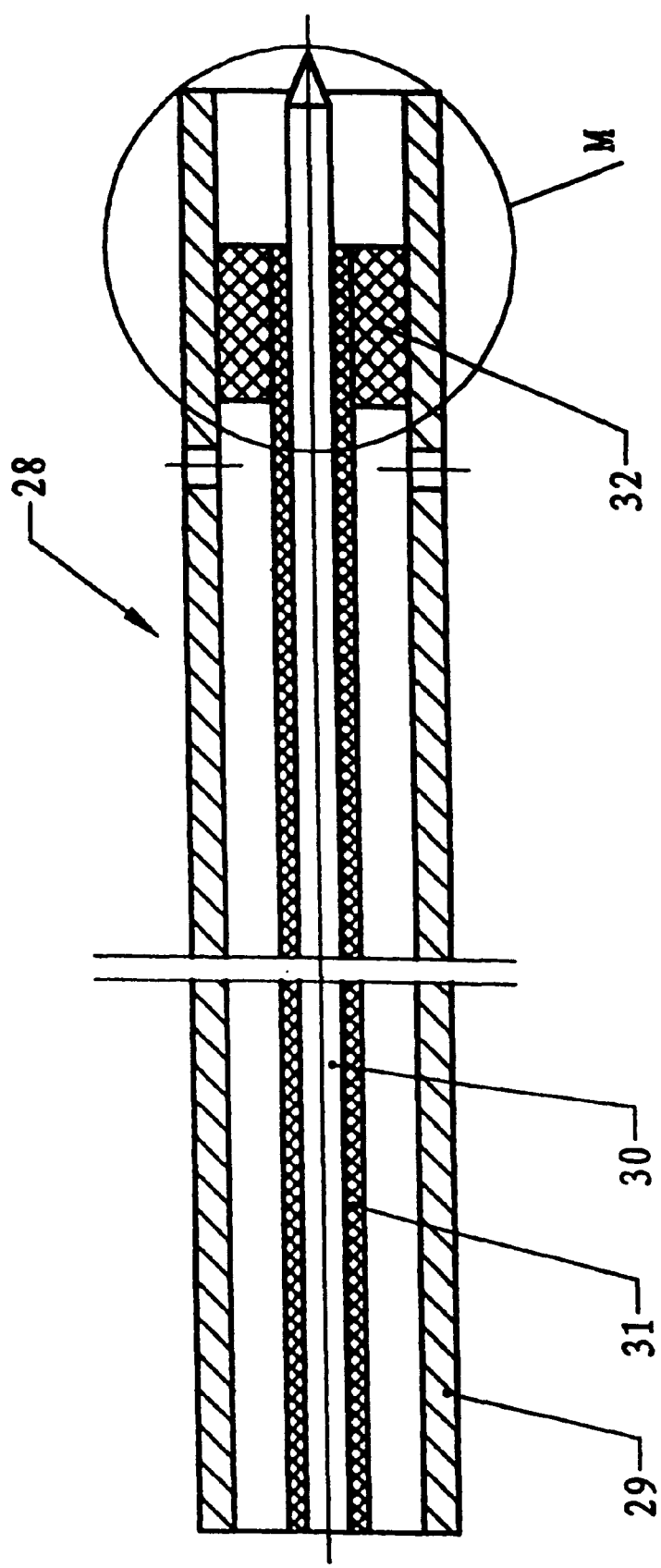
FIG. 3 is a sectional view of the humidity sensor part and the drip tube used in the embodiment of the present flower-watering device.

Below is a description of the control process of the flower-watering device over the moisture of the soil. The said control process is realized through the drip pipe and the control circuit. FIG. 3 shows the humidity sensor and the drip pipe 28 used in the present embodiment. A soil humidity sensor is installed at the lower end of the drip pipe 28 (right side in FIG. 3), which is indicated as an encircled M in the right of FIG. 3. The soil humidity sensor component M consists of two conducting electrodes 29 and 30 and two insulators 31 and 32 that insulate the said two conducting electrodes. One electrode of the said sensor part M serves as the metal casing 29 of the drip pipe while the another conducting electrode serves as the metallic needle 30. The metallic needle 30 is fixed in the plastic insulator 31 and the plastic insulator 32 fixes the metallic needle 30 in the metal casing 29 of the drip pipe 28 through interference fit.

When the soil humidity sensor part M is planted into the soil, the soil then enters between the two conducting electrodes 29 and 30 of the soil humidity sensor and serves as the mediator. Because of the close relation between the conductivity of the soil and the water content of the soil, the humidity of the soil can be easily measured by inducing the electrical current that passes through the soil.

Figure 4:
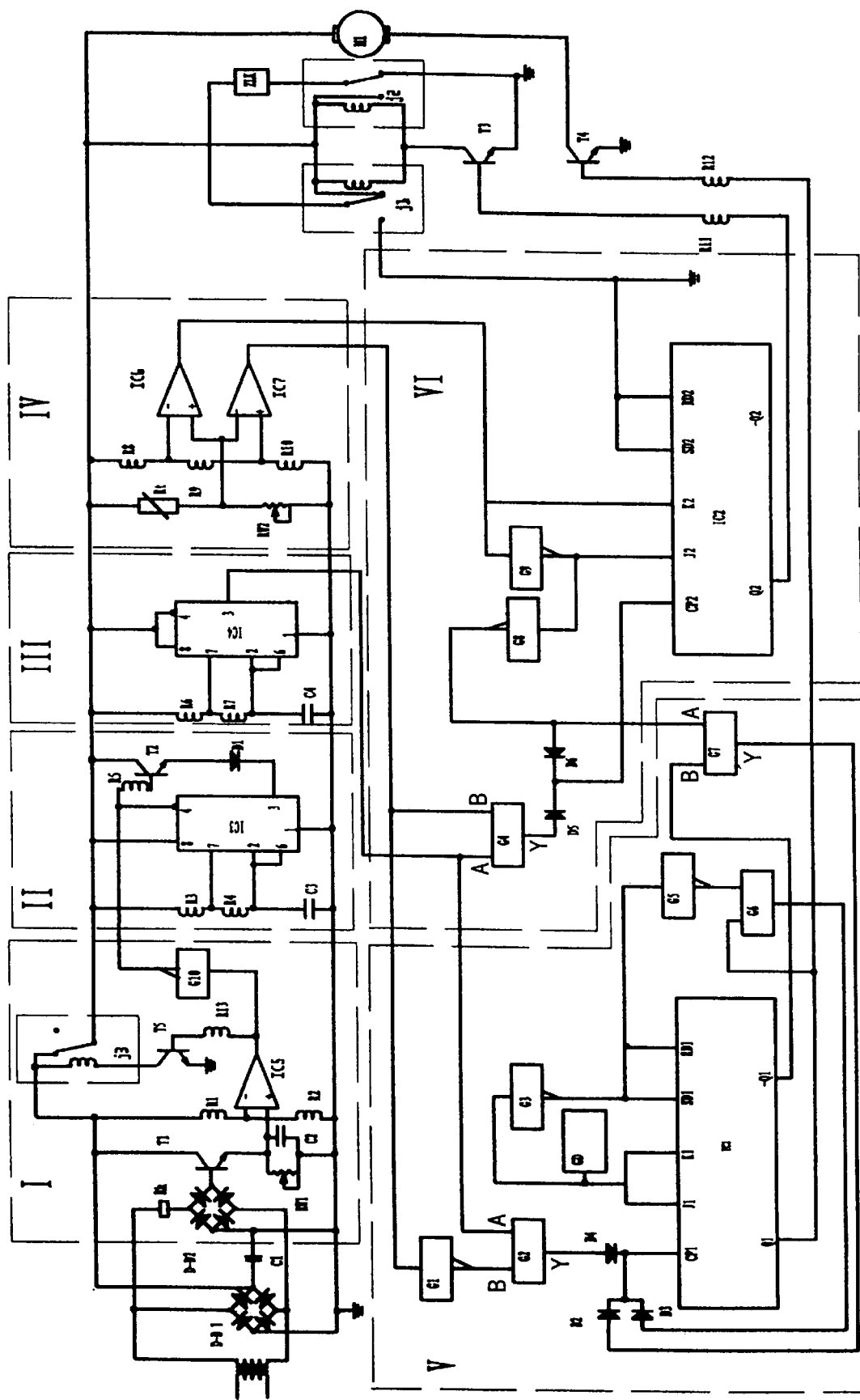
FIG. 4 shows the control circuit of the embodiment of present flower-watering device.

FIG. 4 shows the control circuit used in the watering device in the present embodiment, in which the soil humidity detecting and control unit sends the AC signal stepped down by the AC transformer through the AC resistance humidity probe Rh to the bridge rectifier circuit D-D2 where the signal is rectified and amplified by the translator T1 before it flows via the emitter of the translator to a voltage sampling circuit formed by capacitor C2 and the variable resistor RW1 in parallel connection. The voltage is induced by the voltage sensing switch formed by the voltage comparator IC5, the resistor R1 and R2 so that it produces a voltage switch signal.

When the soil moisture exceeds the predestined value set by the variable resistor RW1, the output end of the voltage comparator IC5 is at a high level, thus the base electrode is at a high level and thus triggers the translator T5 into a conduction state. Meanwhile, the current relay J3 is actuated and stops providing power for the semi-conductor cooling block ZLK and other parts of the circuit.

When the soil moisture is below the predestined value set by the variable resistor RW1, the output end of the voltage comparator IC5 is at a low level and thus switches off the translator T5. Meanwhile, the current relay J3 reverts to its normally closed conduction state and effects normal supplying power and watering.

The flower watering device in the present embodiment also owns the function of defrosting. As is shown in FIG. 4, when the environmental temperature stays at a low level, the water drops attached on the surface of the condensing fins 4 form a film of frost or ice. In order to ensure the normal operation of the water wiper, the frost or the ice must be removed. Whether the water drops on the surface of the condensing fins 4 condenses into frost is determined by the temperature sensing circuit of the condensing mechanism (see FIG. 4-IV), which consists of a temperature adjusting circuit made up of a resistor-type heat sensor Rt and a variable resistor RW2, a voltage comparator IC6, IC7 and a reference voltage circuit made up of a resistor R8, R9 and R10.

Delay voltage signals are sent through terminal 3 of the time-base integrated circuit IC4 to terminal 4 of the "AND" gate G4, while signals from the temperature-sensing voltage comparator IC7 are sent to the terminal B of the "AND" gate G4. The signals from the terminal Y of the "AND" gate G4 are sent upward the terminal CP2 of the rising edge J-K trigger IC1 which burst from a rising edge of a pulse signal though diode D5. (see the "VI" part showed in FIG. 4)

After a period of condensation, the capacitor C4 achieves a charging, which makes the output end 3 of the time-base integrated circuit IC4 revert and generate the high-level electric signals, which are sent to the terminal A of the "AND" gate G4. If the temperature of the condensing part at present is below the frosting temperature t1, the voltage comparator IC7 of the temperature sensing circuit will generate the high-level signals that will reach the terminal B of the "AND" gate G4, whereupon the terminal Y of the "AND" gate G4 will generate the high-level signals, which sent upward the terminal CP2 of the rising edge J-K trigger IC2 which burst from a rising edge of a pulse signal, and a high level is maintained at the terminal Q2 of said J-K trigger IC2. These high-level signals are converted into two working currents that drive the two relays through the power-amplifier transistor T3. The positive end of the cooling block electrode ZLK is connected to the gating point of the relay J1 while its negative end is connected to the gating point of the relay J2. Furthermore, the positive end of the direct current power supply that provides power for the cooling block 8 is joined to the normally closed contact of the relay J1 and the normally opened contact of the relay J2, while the its negative end is joined to the normally opened contact of the relay J1 and the normally closed contact of the relay J2. Therefore, when the gating points of the two relays are engaged with their respective normally opened contacts under the force of the driving currents, the direction of the current that flows towards the semi-conductor cooling block 8 is reversed, causing the original refrigerating surface 81 of the cooling block 8 to heat up and the original heat radiating surface 82 of the cooling block 8 to cool down.

When the defrosting is completed, the condensing part has a temperature higher than the melting temperature t2 of the frost; therefore, the voltage comparator IC6 of the temperature sensing circuit produces the high-level signals which are sent to the terminal K2 of said J-K trigger IC2. Meanwhile, the signals are conversed into the low-level signals through the terminal Y of the reverser G8 and sent to the terminal_J2 of said J-K trigger IC2. Then the signals are further changed into a high-level signals through the terminal Y of the reverser G8. One portion of the signals is sent through the diode D6 to the terminal CP2 of said J-K trigger IC2 (another portion of the signals is sent to the control circuit of the water wiper), which makes the high-level end Q2 of said J-K trigger IC2 to revert and therefore change the low-level signals. The power-amplifier transistor T3 then shuts off the currents of the relay drivers J1 and J2, reverting the current that flows towards the semi-conductor cooling block 8 to its normal direction.

In addition, FIG. 4 also shows the control circuit of the water wiper used in the present embodiment of the flower watering device. The control circuit consists of a delay circuit, a logic circuit and an amplifying circuit. The said delay circuit (see the "III" part showed in FIG. 4) is made up of a capacitor C4, a resistor R6 and R7 and a time-base integrated circuit IC4, in which the delayed voltage signal is sent to the port A of the "AND" gate G2 while the signal coming from the temperature switch (see the "VI" part showed in FIG. 4) arrives at the port B of the "AND" gate G2 through the reverser G1. The signal from the port Y of the "AND" gate G2 is transmitted through the diode D4 to the terminal CP1 of the rising edge J-K trigger IC1 which burst from a rising edge of a pulse signal.

After a period of condensation, the charging of the capacitor C4 is completed and is then discharged. When the output end 3 of the time-base integrated circuit IC4 becomes to the high level, the high-level signals are sent to the terminal A of the "AND" gate G2. If the temperature of the condensing part is higher than the frosting temperature t1, the voltage comparator IC 7 of the temperature sensing circuit then produces the low-level signals, which are changed into a high-level signals through the reverser G1 and arrive at the terminal B of the "AND" gate G2. A high-level electric signals engendered by the terminal Y of the "AND" gate G2 bursts through the diode D4 the terminal CP1 of said J-K trigger IC1, which maintains the terminal Q1 of said J-K trigger IC1 at a high level. The said high-level signals are converted by the power-amplifier transistor T4 into an electric current that drives the servo-actuator 23 of the water wiper (indicated as M1 in FIG. 4). If the temperature of the condensing part is lower than the frosting temperature t1, the voltage comparator IC7 of the temperature sensing circuit then produces the high-level signals, which trigger the defrosting circuit. When the defrosting is finished, the temperature of the condensing part becomes higher than the defrosting temperature t2, and the voltage comparator IC6 of the temperature sensing circuit then produces the high-level signals which are sent to the terminal A of the "AND" gate G7. The signals of the terminal B of the "AND" gate G7 come from the said terminal –Q of said J-K trigger IC1. When the water wiping mechanism remains in the original position, the terminal –Q of said J-K trigger IC1 stays at a high level and the terminal Y of the "AND" gate 7 produces the high-level signals that burst the terminal CP1 of said J-K trigger IC1 through the diode D2, which enables the terminal Q1 of said J-K trigger IC1 at a low level to become to a high-level state. The high-level signals are converted into a current (indicated as M1 in the drawing) that drives the servo-actuator 23 of the water wiper through the power-amplifier transistor T4.

When the water wiping mechanism return to its original position, the photo-electric switch then produces a high-level signal which is sent to the terminal J1 and K1 of said J-K trigger IC1 before it is changed into the low-level signal through the reverser G3. A potion of the signals is sent to the terminal SD1 and RD1 of said J-K trigger IC1. Another portion of the signals is changed into the high-level signals through the reverser G5 and is then sent to the terminal A of the "AND" gate G6, and the signals at the terminal B of the "AND" gate G6 come from the terminal Q1 of said J-K trigger IC1. At the moment when the wiper reverts to its original position, the terminal Q1 of said J-K trigger IC1 is put at a high level; therefore, the terminal Y of the "AND" gate G6 produces the high-level signals which then burst the terminal CP1 of said J-K trigger IC1 through the diode D3, thus causing the terminal Q1 of said J-K trigger IC1 which is at a high level to revert to a low level and the power-amplifier transistor T4 to cut off the current that drives the servo-actuator 23 (shown as M1 in the drawing) of the water wiper.

The "II" part in FIG. 4 shows the soil moisture alarm unit of the control circuit. Specifically speaking, this is a circuit that alerts the lack of condensation which is composed of a time-base integrated circuit IC3, a resistor R3, R4, R5, a capacitor C3, an LED D1 and a translator T2.

The capacitor C3 completes charging after a period of time and is then discharged in order to let the output port 3 of the time-base integrated circuit IC3 to revert to a low level. If the soil moisture now does not attain the predestined value (a little dry), the voltage comparator IC5 then outputs a low-level signal which changes into high level via the reverser G10. The translator T2 is thus turned on and begins to drive the LED to give alarm by light.

If the capacitor C3 is again discharged after the charging is completed and the humidity of the soil reaches the predestined value (that is, a little humid) before the output port 3 of the time-base integrated circuit IC3 is reverted to the low level, the voltage comparator IC5 of the control circuit that detects the humidity of soil then produces high-level signals which become how-level ones after passing through the reverser G10. The translator T2 is then is turned off and at the same time, the setting port 4 of the time-base integrated circuit IC3 is turned to a low level. The internal trigger is reverted, which helps discharge the capacitor C3. The LED D1 then does not give alarm by light during the charging time of the capacitor C3 and the capacitor C3 enters the next charging cycle.

What is claimed is:

1. An automatic semi-conductor condensate flower watering device comprises a condensate part, a heat radiating part and a soil moisture control part, in which said condensate part composed of a semi-conductor cooling block with a refrigerating and heat-conducting base plate and a heat radiating and conducting base plate attached to both of its sides, and condensate and heat radiating fins are installed on the heat radiating and conducting base plate; said heat radiating part includes heat radiating fins and a heat outlet channel formed by the heat radiating fins, wherein:

said condensing fins have very small gaps between them, and accordingly, on the said cooling and heat conducting base plate is also mounted a water wiper;

said soil moisture control part includes a moisture control circuit and a humidity alarm unit.

2. An automatic semi-conductor condensate flower watering device according to claim 1, wherein that the gap between the said refrigerating fins is less than or equal to 1.5 mm.

3. An automatic semi-conductor condensate flower watering device according to claim 1, wherein that the gap between the said heat radiating fins is less than or equal to 1.5 mm.

4. An automatic semi-conductor condensate flower watering device according to claim 1, wherein that the refrigerating surface and the heat delivery surface of the semi-conductor cooling block contact with the condensing and heat conducting base plate and the heat radiating and conducting base plate respectively.

5. An automatic semi-conductor condensate flower watering device according to claim 4, wherein that the said semi-conductor cooling block consists of two TECI-12704 type cooling blocks connected in series.

6. An automatic semi-conductor condensate flower watering device according to claim 1, wherein that the said water wiper consists of a slide block and a water brush fixed on it, with the slide block installed on a drive screw, as well as a servo-actuator which drives the drive screw through the gear; transmission balls that are located within the spiral line of the drive screw, said transmission balls are provided between two axial sides of the drive screw and the slide block are installed.

7. An automatic semi-conductor condensate flower watering device according to claim 6, wherein that the said drive screw has an interlacing left-hand screw thread and a right-hand screw thread with the same thread pitch, that there is a connecting groove that joins the two screw threads in the same direction that the screw threads run at both ends of the screw threads of the drive screw, and that there is a connecting groove at a distance of about 1.5 times the thread pitch from either end of the screw threads on the drive screw.

8. An automatic semi-conductor condensate flower watering device according to claim 1, wherein that further a humidity sensor and a drip pipe, and a soil humidity sensor (M) is installed at the lower end of the drip pipe; said soil humidity sensor component (M) consists of two conducting electrodes and two insulators that insulate the said two conducting electrodes.

9. An automatic semi-conductor condensate flower watering device according to claim 1, wherein that further comprises a temperature-sensing circuit in the condensing part, the said circuit consisting of a temperature calibrating circuit that is made up of a resistor-type heat sensor and a variable resistor, two voltage comparators, and a reference voltage circuit composed of resistors.

10. An automatic semi-conductor condensate flower watering device according to claim 1, wherein that further comprises a soil moisture alarm unit which is composed of a time-based integrated circuit, resistors, a capacitor, an LED and a translator.

11. An automatic semi-conductor condensate flower watering device according to claim 2, wherein that the gap between the said heat radiating fins is less or equal to 1.5mm.

12. An automatic semi-conductor condensate flower watering device according to claim 9, wherein that further comprises a soil moisture alarm unit which is composed of a time-based integrated circuit, resistors, a capacitor, an LED and a translator.

* * * * *